(12) United States Patent
Serkh

(10) Patent No.: US 8,931,610 B2
(45) Date of Patent: Jan. 13, 2015

(54) ISOLATOR DECOUPLER

(71) Applicant: The Gates Corporation, Denver, CO (US)

(72) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 163 days.

(21) Appl. No.: 13/860,736

(22) Filed: Apr. 11, 2013

(65) Prior Publication Data

US 2014/0305765 A1  Oct. 16, 2014

(51) Int. Cl.
*F16H 55/36* (2006.01)
*F16D 41/20* (2006.01)
*F16D 7/02* (2006.01)

(52) U.S. Cl.
CPC .............. *F16D 41/206* (2013.01); *F16D 7/022* (2013.01); *F16H 55/36* (2013.01); *F16H 2055/366* (2013.01)
USPC ........................... 192/55.5; 192/41 S; 474/94

(58) Field of Classification Search
USPC ........................................... 192/55.5; 474/94
See application file for complete search history.

(56) References Cited

U.S. PATENT DOCUMENTS

| | | | |
|---|---|---|---|
| 5,139,463 A | 8/1992 | Bytzek et al. | |
| 6,044,943 A | 4/2000 | Bytzek et al. | |
| 6,083,130 A | 7/2000 | Mevissen et al. | |
| 7,153,227 B2 | 12/2006 | Dell et al. | |
| 7,207,910 B2 | 4/2007 | Dell et al. | |
| 8,678,157 B2 | 3/2014 | Ward et al. | |
| 2004/0104090 A1 | 6/2004 | Jansen et al. | |
| 2010/0116617 A1 | 5/2010 | Serkh et al. | |
| 2011/0065537 A1 | 3/2011 | Serkh et al. | |
| 2011/0245000 A1 | 10/2011 | Serkh | |
| 2012/0298474 A1 * | 11/2012 | Ward et al. | 192/41 S |
| 2013/0217524 A1 | 8/2013 | Antchak | |
| 2013/0237351 A1 | 9/2013 | Marion | |
| 2014/0008175 A1 * | 1/2014 | Schneider et al. | 192/41 S |

FOREIGN PATENT DOCUMENTS

WO   2005057037 A1   6/2005

OTHER PUBLICATIONS

Peter Ward et al; "Isolator Decoupler"; U.S. Appl. No. 13/115,204, filed May 25, 2011; USPTO.
Xiaohua Chen et al; "Isolator Decoupler"; U.S. Appl. No. 13/487,755, filed Jun. 4, 2012; USPTO.
European Patent Office, Notification of Transmittal of the International Search Report and the Written Opinion of the International Searching Authority, or the Declaration, Mailing Date Jun. 23, 2014.

* cited by examiner

*Primary Examiner* — Richard Lorence
(74) *Attorney, Agent, or Firm* — Jeffrey A. Thurnau, Esq.; Paul N. Dunlap, Esq.

(57) ABSTRACT

An isolator decoupler comprising a pulley, a shaft, the pulley journalled to the shaft on a low friction bushing, a spring carrier, the pulley journalled to the spring carrier on a low friction bushing, the spring carrier journalled to the shaft on a low friction bushing, a torsion spring coupled between the pulley and the spring carrier, a one way clutch spring frictionally engaged with the shaft, the one way clutch spring coupled to the spring carrier, the one way clutch spring is disposed radially inward of the torsion spring, and the pulley temporarily engagable with an end of the one way clutch spring whereby the frictional engagement of the one way clutch spring with the shaft is temporarily diminished.

7 Claims, 3 Drawing Sheets

ISOLATOR DECOUPLER

FIELD OF THE INVENTION

The invention relates to an isolator decoupler having a pulley journalled to a shaft on a low friction bushing and journalled to a spring carrier on a low friction bushing, which spring carrier is journalled to the shaft on a low friction bushing.

BACKGROUND OF THE INVENTION

This invention relates to alternator tuning devices, particularly to alternator isolating decoupler (AID) pulleys with torsion springs for isolation. The function and utility of alternator tuning devices is commonly known. Today's commercially available AID devices have an isolating spring, one way clutch, bearing(s), a pulley and certain other components. The need for each of these components typically requires the overall size diameter of the device to exceed what the industry desires. With todays ever smaller automotive engine sizes and ever increasing fuel efficiency requirements, there is a need for AID devices that have a reduced pulley diameter while meeting the required functionailty.

Representative of the art is U.S. Pat. No. 7,153,227 which discloses a decoupler for an alternator pulley in a serpentine drive system has a resilient, helical spring member that couples the alternator pulley with a hub structure through a spring retaining member. A bushing is disposed between the spring retaining member and the hub structure to facilitate sliding engagement therebetween. An annular sleeve member is disposed between the spring member and the alternator pulley to facilitate sliding engagement therebetween. The spring member is connected at one end thereof to the hub structure and connected at an opposite end thereof to the spring retaining member. The resilient spring member transmits the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement.

Also representative of the art is applicant's copending U.S. non-provisional application Ser. No. 13/541,216 filed Jul. 3, 2012.

What is needed is an isolator decoupler having a pulley journalled to a shaft on a low friction bushing and journalled to a spring carrier on a low friction bushing, which spring carrier is journalled to the shaft on a low friction bushing. The present invention meets this need.

SUMMARY OF THE INVENTION

The primary aspect of the invention is an isolator decoupler having a pulley journalled to a shaft on a low friction bushing and journalled to a spring carrier on a low friction bushing, which spring carrier is journalled to the shaft on a low friction bushing.

Other aspects of the invention will be pointed out or made obvious by the following description of the invention and the accompanying drawings.

The invention comprises an isolator decoupler comprising a pulley, a shaft, the pulley journalled to the shaft on a low friction bushing, a spring carrier, the pulley journalled to the spring carrier on a low friction bushing, the spring carrier journalled to the shaft on a low friction bushing, a torsion spring coupled between the pulley and the spring carrier, a one way clutch spring frictionally engaged with the shaft, the one way clutch spring coupled to the spring carrier, the one way clutch spring is disposed radially inward of the torsion spring, and the pulley temporarily engagable with an end of the one way clutch spring whereby the frictional engagement of the one way clutch spring with the shaft is temporarily diminished.

BRIEF DESCRIPTION OF THE DRAWINGS

The accompanying drawings, which are incorporated in and form a part of the specification, illustrate preferred embodiments of the present invention, and together with a. description, serve to explain the principles of the invention.

DETAILED DESCRIPTION OF THE PREFERRED EMBODIMENT

Figure 1:
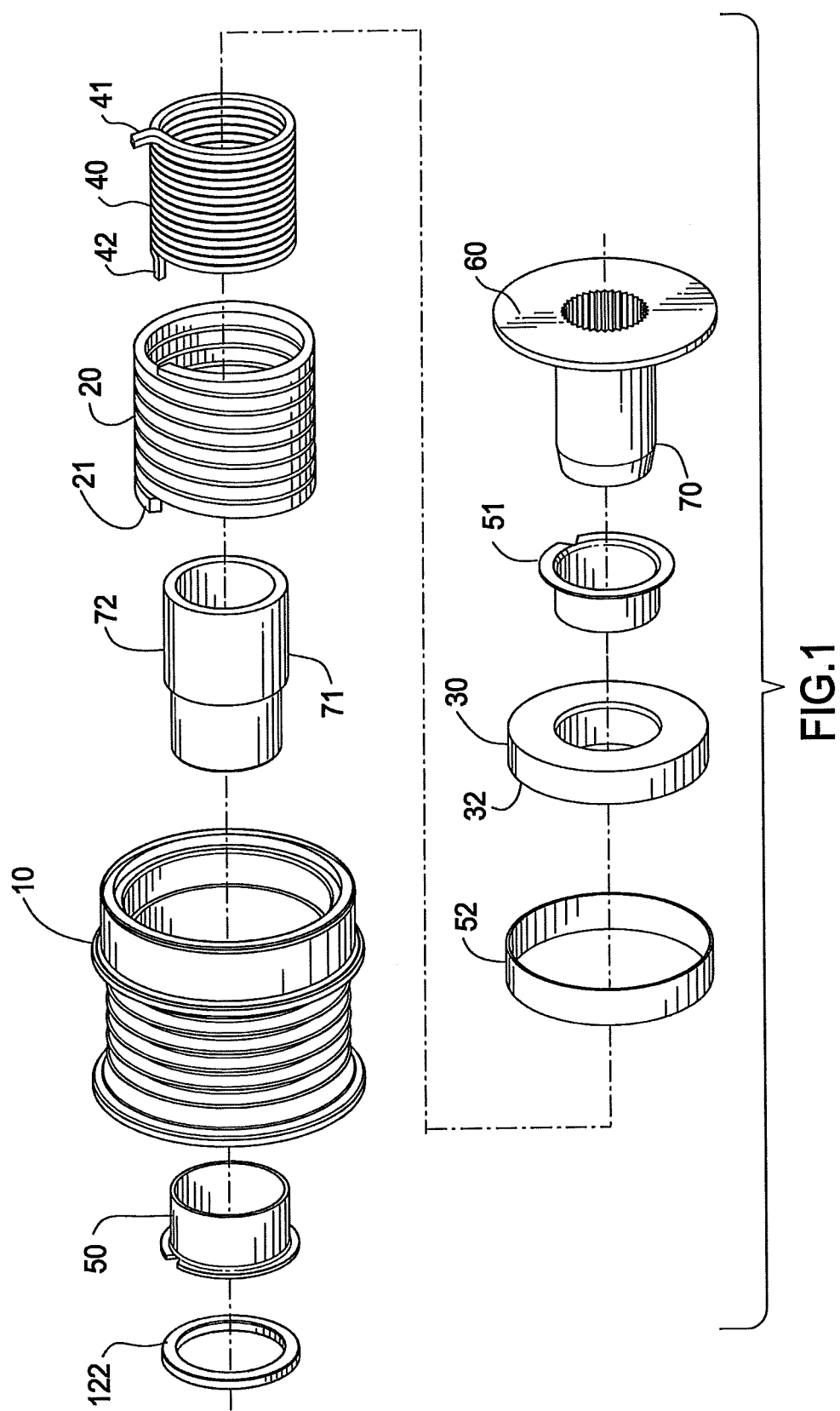
FIG. 1 is an exploded view of the device.

FIG. 1 is an exploded view of the inventive device. The invention comprises a pulley 10, an isolating torsion spring 20, a spring carrier 30, a wrap spring one-way clutch 40, low friction bushings 50, 51, 52, a shaft 70 with a dust cover 60. Shaft 71 is press fit upon shaft 70.

In particular, pulley 10 is journalled to shaft 71 on bushing 50. Spring carrier 30 is journalled to shaft 70 on bushing 51. Pulley 10 is journalled to spring carrier 30 on bushing 52. In this embodiment pulley 10 has a multi-ribbed profile for engaging a belt on a vehile engine front end accessory drive (FEAD).

Bushings 50, 51, 52 are used instead of other types of bearings such as needle bearings or ball bearings because the bushings allow the device to have a smaller overall diameter. In an alternate embodiment bushing 50 can be replaced with a bearing such as a needle bearing or ball bearing.

Wrap spring one way clutch 40 is a helically wound spring and is wrapped about an outer surface 72 of shaft 71. The inside diameter of clutch spring 40 is slightly less than an outside diameter of shaft surface 72. This assures that the engagement between the wrap spring one way clutch 40 and the shaft surface 72 is frictional. An end of wrap spring one way clutch 40 is coupled to the spring carrier receiving portion 32. Wrap spring one way clutch 40 is disposed radially inward of the torsion spring 20 between the torsion spring 20 and the shaft 70 and 71. Spring 40 is loaded in the winding direction during operation.

Torsion spring 20 is coupled beteen the pulley 10 and the spring carrier 30. In operation torsion spring 20 is loaded in the unwinding direction by a belt engaged with pulley 10. In an alternate embodiment, the torsion spring 20 is loaded in the winding direction.

A dust cover 60 prevents debris from entering the device and fouling the bushings. Retaining ring 122 is press fit onto shaft 71.

Torque transmission in the inventive device is from the pulley 10 to the torsion spring 20 to the spring carrier 30 to the wrap spring one-way clutch 40 to the shaft 71. In operation the wrap spring one way clutch 40 is loaded in the winding direction. This allows the wrap spring 40 to clamp and frictionally engage shaft 71 on surface 72.

Figure 2:
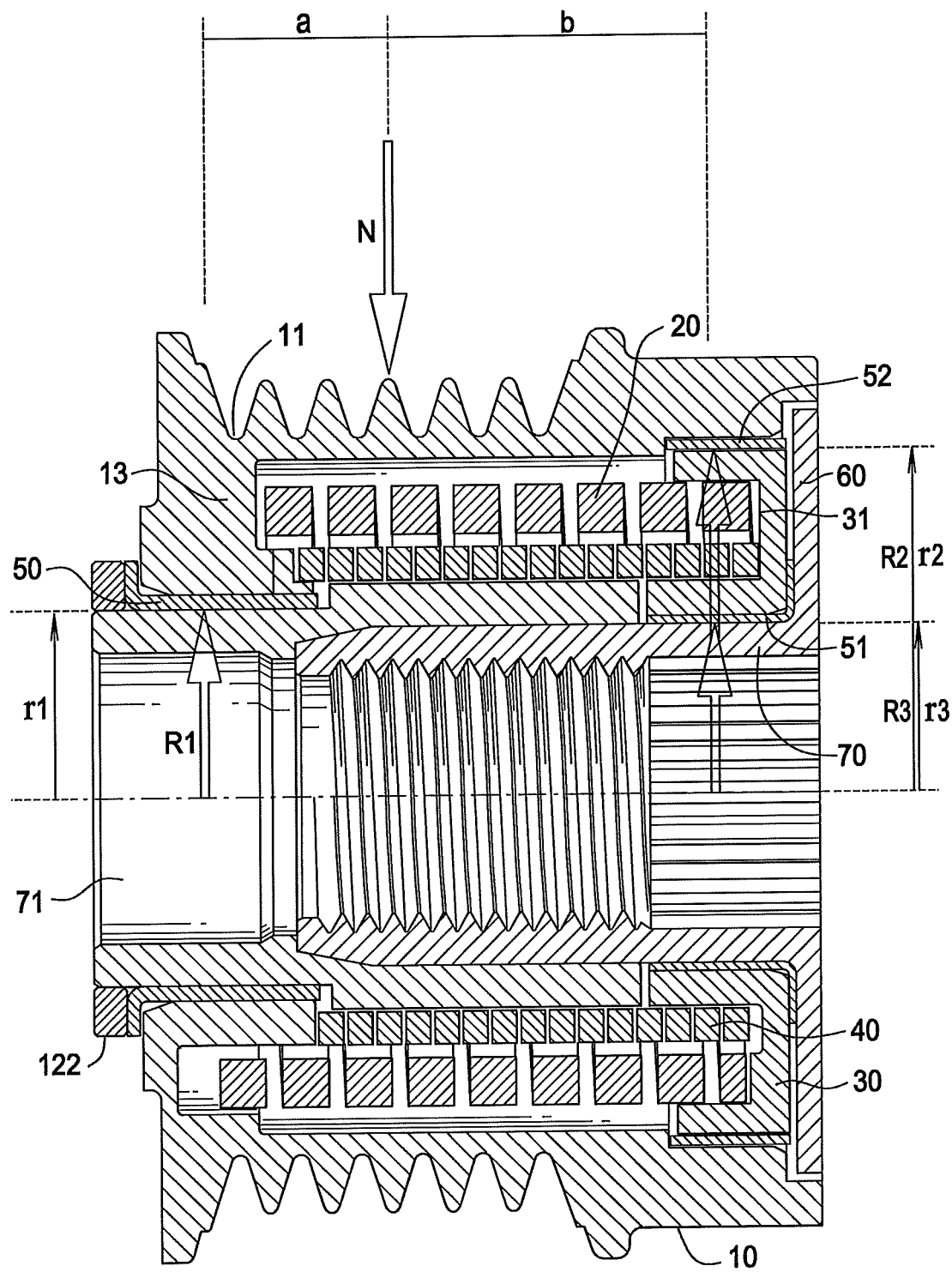
FIG. 2 is a cross-sectional view of the device.

FIG. 2 is a cross-sectional view of the device. Spring carrier 30 is rotationally moveable on bushing 51 relative to shaft 70.

Belt tension generates a hubload N. Belt tension operates normally to pulley 10. Hubload is the result of tension on the tight and slack spans of the belt and wrap angle, that is, the angular span of the pulley portion contacted by the belt. In practical terms the torque applied to an alternator pulley is approximately 15 N-m. Given a pulley diameter 54 mm the effective tension is approxiamtely 556 N. Slack side tension is typically 250 N. Tight side tension then is around 806 N and hubload is in the range of 800 N to 1056 N depending on wrap angle.

Referring to FIG. 2,

N—belt hubload
R1—reaction on bushing 50
R2—reaction on bushing 52
R3—reaction on bushing 51
a—distance between N and R1
b—distance between N and R2/R3
r1—radius of bushing 50
r2—radius of bushing 52
r3—radius of bushing 51
m1—coefficient of friction of bushing 50
m2—coefficient of friction of bushing 52
m3—coefficient of friction of bushing 51
T1—friction torque on bushing 50
T2—friction torque on bushing 52
T3—friction torque on bushing 51

Friction torque can be calculated based on geometry (a and b), radius of friction surface (r1, r2, and r3), and coefficient of friction (m1, m2, and m3): T=R*r*m (for each bushing). For example above:

r1=12 mm
r2=23 mm
r3=10 mm
m1=m2=m3=0.15
a=15 mm, b=22 mm
Assuming N=1000N, $$R1 = N*b/(a+b) = 595N$$

$$R2 = R3 = N*a/(a+b) = 405N$$

Friction torque can then be calculated for each bushing:
T1=1.07N-m
T2=1.39N-m
T3=0.6N-m The inventive device uses bushing 50 during isolation and over running, bushing 52 only for isolation, and bushing 51 only for over running. "Isolation" refers to when the device is being used to transmit torque to the connected aacessory, such as a alternator. "Over running" refers to when the engine decelerates and as a result the rotational speed of the accessory such as an alternator temporarily exceeds the rotational speed of the device. It is advantageous to have damping or internal friction higher for isolation and lower for over running. Total friction torque during isolation is:

$$T_{is} = T1+T2 = 2.46\text{N-m}$$

and during over running $$T_{ov} = T1+T3 = 1.67\text{N-m}$$

This means that torque during over running is about 32% smaller than that during isolation which is significant.

Another aspect of the invention is reduction of PV (pressure/velocity) load on bushings 52 and 51. Both bushings 51, 52 are of a small width, approximately 5 mm to 8 mm. Subjecting bushing 52 to work during over running can lead to over heating and premature wear. The velocity during over running on the surface of the bushing 52 can reach 10.9 m/s (over running speed can reach 4750 rpm). In the case when bushing 51 works during over running this number is lass than half, or 4.74 m/s. For wear and durability reduction of the velocity is threfore more important.

It is also known that the rated peak torque of an alternator is less than the peak torque observed when starting the engine. For example, a typical automotive alternator will have a rated peak torque of 12 Nm, an inertia of 0.0030 kg m$^2$, and an acceleration rate at the alternator of 8,400 rad/s$^2$ during engine starting. Using Equation 1 at engine start-up the device must be able to handle 25.2 Nm of torque, but will not see such a high torque during all other operating conditions.

$$T = I\alpha \qquad \text{Equation 1}$$

T=torque
I=alternator inertia
α=acceleration rate
T=(0.0030)*8400=25.2 Nm

To optimize torsion spring 20 it is beneificial to have an overload feature that prevents excessive torque such as that which can be realized during start up, transmitted from the pulley 10 to the isolating torsion spring 20. Excessive torque applied to torsion spring 20 could overstress torsion spring 20 causing premature failure. The inventive device is configured in such a way that when the pulley 10 attemps to transmit torque that exceeds a predetermined level, an overload feature is enabled.

Wrap spring one way clutches are known. They operate by tension in the wrap spring causing the wrap spring to tighten around a shaft in the winding direction. The tension creates a normal force between the wrap spring and shaft. The normal force generates friction between the wrap spring and shaft which enables the transmission of torque to the shaft. Releasing the tension in the wrap spring reduces or removes the normal force thereby diminishing or releasing the wrap spring as a clutch function.

Pulley 10 in the inventive device compises has an engaging surface 11 for engaging an end 42 of the wrap spring one-way clutch 40. Pulley 10 engages the wrap spring one way clutch by contacting the end 42, and in doing so wrap spring one-way clutch 40 is unwound from the shaft 10. The result of this unwinding is the reduction of tension in the wrap spring one way clutch 40 which results in the release of the wrap spring one-way clutch from the shaft surface 72.

Figure 3:
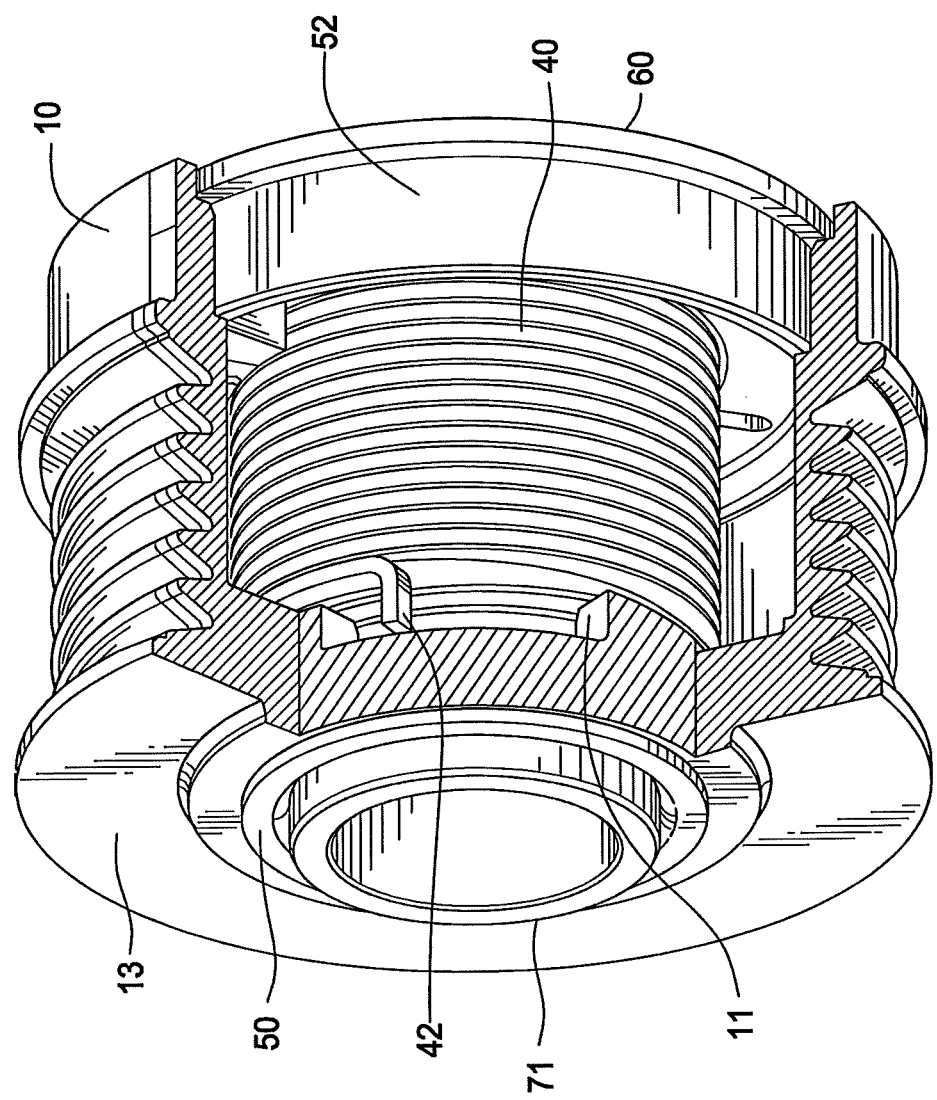
FIG. 3 is a detail of FIG. 2.

FIG. 3 is a detail of FIG. 2. The described overload feature releases the wrap spring one-way clutch 40 allowing it to slip on shaft surface 72 which effectively removes the alternator inertia from Equation 1 and thus reduces the torque transmitted, in turn eliminating exposure of the torsion spring 20 to excessive torque. Disengagement of spring 40 from engaging surface 72 occurs when, at a predetermined torque the deflection of the isolating torsion spring 20 allows the pulley 10 to rotate a sufficient amount to cause the engaging surface face 11 to engage spring end 42. Pulley 10 is thus temporarily engagable with the wrap spring one way clutch end 42 in a wrap spring unwinding direction which temporarily enlarges the inside diameter of spring 40. This enlargement caused by the temporary contact with the pulley 10 partially or totally releases the frictional engagement of the wrap spring one way clutch 40 from the shaft surface 72, which in turn allows the shaft to slip and thereby to rotate relative to the wrap spring one way clutch.

The isolating torsion spring 20 is installed such that is it loaded in the unwinding direction. End 21 of spring 20 engages a surface 13 of pulley 10. Torsion spring 20 is arranged such that it has an interference fit on the inside diameter with each of its two mating parts, namely, the pulley 10 inner surface 12 and spring carrier 30 inner surface 31. This interference maintains the rotational postion of these components during conditions where the shaft 70, 71 overruns pulley 10 such as during vehicle transmission shifts.

During normal loading the isolating torsion spring 20 transmits torsion forces from the pulley to the spring carrier. Maintaining contact between the torsion spring 20 and pulley 10 and spring carrier 30 is desirable to prevent separation of these components and therefore eliminate the associated potential noise generation when normal driving function resumes bringing these components together again after an overrun condition occurs. The interference fit causes the isolating torsion spring 20 to act somewhat like a wrap sping during overrun conditions which maintains the proper component contact.

Although a form of the invention has been described herein, it will be obvious to those skilled in the art that variations may be made in the construction and relation of parts without departing from the spirit and scope of the invention described herein.

I claim:

1. An isolator decoupler comprising:
   a pulley;
   a shaft;
   the pulley journalled to the shaft on a low friction bushing;
   a spring carrier;
   the pulley journalled to the spring carrier on a low friction bushing, the spring carrier journalled to the shaft on a low friction bushing;
   a torsion spring coupled between the pulley and the spring carrier;
   a one way clutch spring frictionally engaged with the shaft, the one way clutch spring coupled to the spring carrier;
   the one way clutch spring is disposed radially inward of the torsion spring; and
   the pulley temporarily engagable with an end of the one way clutch spring whereby the frictional engagement of the one way clutch spring with the shaft is temporarily diminished.

2. The isolator decoupler as in claim 1, wherein the torsion spring is loaded in the unwinding direction.

3. An isolator decoupler comprising:
   a pulley;
   a shaft;
   a spring carrier;
   the pulley journalled to the spring carrier and the shaft on low friction bushings;
   a torsion spring coupled between the pulley and the spring carrier;
   a wrap spring one way clutch wrapped about the shaft and having a frictional engagement, the wrap spring one way clutch coupled to the spring carrier;
   the wrap spring one way clutch is disposed radially inward of the torsion spring; and
   the pulley temporarily engagable with an end of the wrap spring one way clutch in an unwinding direction whereby a temporary contact between the wrap spring one way clutch end and the pulley can temporarily release the frictional engagement of the wrap spring one way clutch from the shaft.

4. The isolator decoupler as in claim 3, wherein the torsion spring is loaded in the unwinding direction.

5. An isolator decoupler comprising:
   a pulley;
   a shaft;
   a spring carrier;
   the pulley journalled to the shaft;
   the pulley further journalled to the spring carrier on a low friction bushing;
   the spring carrier journalled to the shaft on a low friction bushing;
   a torsion spring coupled between the pulley and the spring carrier;
   a one way clutch spring coupled to the spring carrier, the one way clutch spring frictionally engaged to the shaft;
   the one-way clutch spring disposed radially inward of the torsion spring; and
   the pulley temporarily engagable with an end of the one way clutch spring in an unwinding direction whereby a temporary contact between the one way clutch spring end and the pulley will temporarily diminish the frictional engagement of the one way clutch spring with the shaft.

6. The isolator decoupler as in claim 5, wherein the torsion spring is loaded in an unwinding direction.

7. The isolator decoupler as in claim 5, wherein the pulley is journalled to the shaft on a bearing.

\* \* \* \* \*